United States Patent [19]

Delahaye et al.

[11] 3,998,477
[45] Dec. 21, 1976

[54] NON-RIGID CONNECTION FOR CIRCULAR PIPES

[75] Inventors: Henri Delahaye, Lyon; Fernand Fabre; Lucien Guerrera, both of Marseille, all of France

[73] Assignee: Produits Chimiques Ugine Kuhlmann, Paris, France

[22] Filed: July 24, 1974

[21] Appl. No.: 491,456

[30] Foreign Application Priority Data

July 30, 1973 France .............................. 73.27775

[52] U.S. Cl. .............................. 285/93; 285/110; 285/133 R; 285/233; 285/351; 285/368; 285/DIG. 12
[51] Int. Cl.² .............................. F16L 35/00
[58] Field of Search .............. 285/DIG. 12, 133 R, 285/93, 133 A, 138, 110, 111, 363, 368, 351, 233, 49, 52; 250/522–525

[56] References Cited

UNITED STATES PATENTS

| | | | |
|---|---|---|---|
| 364,947 | 6/1887 | Moore | 285/351 X |
| 1,584,394 | 5/1926 | Munley | 285/DIG. 12 |
| 2,438,529 | 3/1948 | Woodling | 285/351 X |
| 2,560,263 | 7/1951 | Wiegand et al. | 285/351 X |
| 2,774,617 | 12/1956 | Lanninger | 285/111 X |
| 3,799,585 | 3/1974 | Frost | 285/93 |

FOREIGN PATENTS OR APPLICATIONS

| | | | |
|---|---|---|---|
| 948,463 | 8/1956 | Germany | 285/111 |
| 409,971 | 3/1945 | Italy | 285/233 |

*Primary Examiner*—Dave W. Arola
*Attorney, Agent, or Firm*—Pennie & Edmonds

[57] ABSTRACT

A device for non-rigid connection of two rigid cylindrical pipes comprises the combined use of flexible double-lipped gaskets and toroid flexible gaskets surrounding a bulb-shaped zone formed in one of the pipes. The device is particularly useful for fastening fragile tubes containing light emitters to metal reactors used for photochemical processes.

7 Claims, 2 Drawing Figures

NON-RIGID CONNECTION FOR CIRCULAR PIPES

BACKGROUND OF THE INVENTION

The present invention relates to a device for the non-rigid connection of pipes having circular cross-section, such as for example the pipes used in fittings for chemical reactors and distillation columns. The usual techniques for connecting such pipes include welding, shaping the tube ends, and various uses of gaskets, couplings, threadings, clamps, collars and the like. These techniques, however, are not satisfactory when the pipes to be connected are fragile as is the case, for example, with pipes made of plastics, glass, quartz or graphite, particularly when the pipes are of great length and must undergo conditions of vibration and high pressure.

In connecting pipes of these more fragile types, a flange system can be used whereby tightness is obtained with the help of flat gaskets but the strong force necessary to secure their tightening achieves at best a very rigid assembly extremely limiting the possibility of movement of the connected pipes and in fact often results in rupture of the flange. The conventional procedure used by glassblowers which consists of inserting tight cylindroconical mouthpieces and, exemplarily, a polytetrafluorethylene gasket is likewise unsatisfactory because of the high rigidity of the resulting system.

The need for an improved connecting device is particularly urgent in the design of plant-scale equipment for carrying out photochemical reactions. Such equipment involves reactors fabricated of metal containing liquid and/or gaseous reactants, usually under pressure which are caused to react under the influence of light. This light, exemplarily ultra-violet light, is supplied by submerging into the reactors a plurality of transparent pipes, exemplarily of glass or quartz, which contain sources of light radiation.

Such photochemical reactions are relatively easily carried out on a laboratory scale wherein the suitable emission of light can be directed to small cells containing the reactants and wherein the connection of the various parts of the apparatus presents no unusual difficulties. However, when these reactions are scaled up to plant operation, they present difficult and burdensome problems arising from the lack of a satisfactory system for joining the reactors to the glass or quartz pipes containing emitters of light, in particular of ultraviolet light.

In order to be sufficiently effective, these pipes must generally be two to three meters long and must operate under a pressure of about 2 to 10 bars, in addition to which they must also support the vibrations and forces due to the pressure differences existing between the reactor and the space enclosed by the pipes. Thus it is required to connect a fragile glass or quartz pipe entering the reactor to an accepting metal neck or sleeve on the reactor in a manner which is both leak proof and resistant to vibration and other mechanical disturbances. Conventional devices such as those described above are not satisfactory for such purposes.

SUMMARY OF THE INVENTION

Present inventors have now developed a device capable of connecting fragile, non-elastic pipes to metal pipes or sleeves which assures excellent tightness and durability to conditions of mechanical stress, vibration or oscillation.

Briefly stated, this invention comprises the combined use of (a) at least one flexible double-lipped gasket contacting the fragile pipe and firmly secured to the metal sleeve by a clamping system and (b) at least two toroid flexible gaskets surrounding the fragile pipe on opposite sides of a bulb-shaped surface thereon, said toroid gaskets being securely positioned against said bulb-shaped zone by means of a housing securely fixed on said clamping system.

This connecting device is particularly suitable for the purpose of fastening glass or quartz tubes containing light emitters to metal reactors or autoclaves in which photochemical reactions are carried out. By means of this device, the tubes which are submerged into the reaction medium, and which are exemplarily 2 to 3 meters in length, are attached to metal necks, collars or sleeves on the reactor in a manner which is both leak proof and resistant to vibration and other mechanical disturbances.

In one embodiment of this invention, two double-lipped gaskets are placed in sequence and joined by a single bracing or crosspiece. Such an arrangement is particularly suitable when it is desired to detect quickly the eventual occurrence of a leak. For the purposes of such detection, a side-tube having access to the space between the two double-lipped gaskets can be connected with any conventional alarm system.

DETAILED DESCRIPTION

Figure 1:
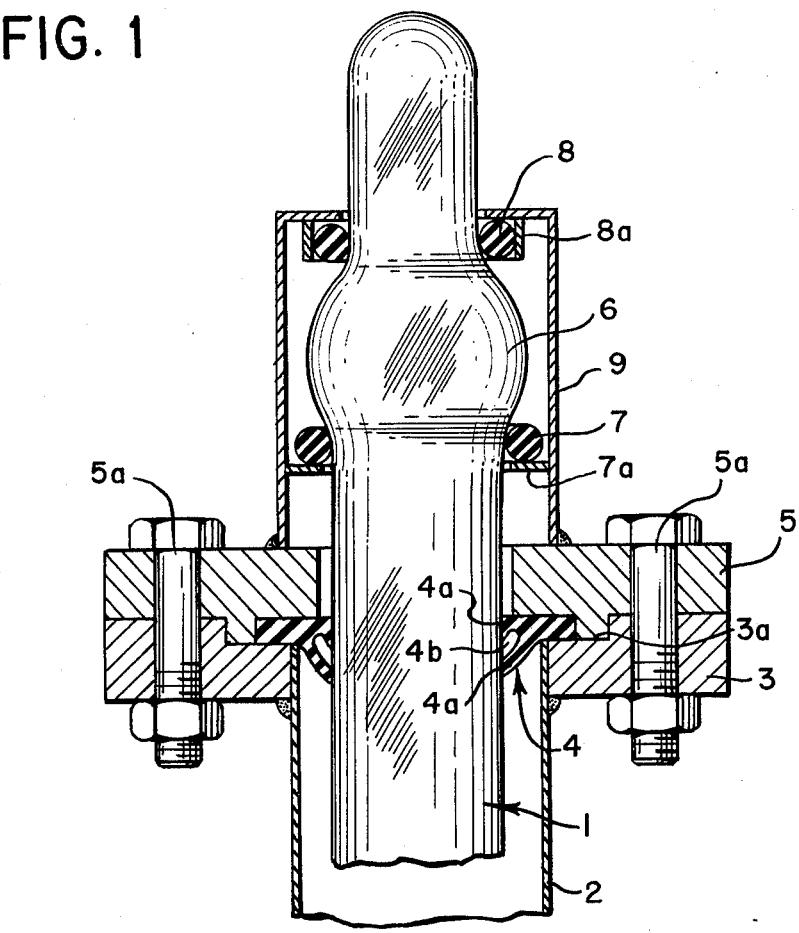
FIG. 1 is a sectional view of the coupling of the invention.

The simplest modification of the device of this invention is illustrated by the FIG. 1, wherein the pipe 1 is connected to the support 2 by means of flange 3 indented to provide a gasket seat 3a. On this indented seat 3a, there rests a gasket 4 having two flexible edges or lips 4a bearing against the exterior surface of pipe 1 in sealing engagement therewith and a clamping flange 5 for tightening the mating flanges 3 and 5 together squeezes gasket 4 to insure tight sealing engagement of the lips 4a against pipe 1.

At a place exterior to this clamping system, pipe 1 has a bulb-shaped zone 6 whereon bear two toroid flexible gaskets 7 and 8 held in place by respective members 7a and 8a extending inwardly from housing 9 which in turn is secured to clamping flange 5, the pipe thus being permitted movement in all directions.

The pipe 1 and support 2 which can be connected by the method of this invention can be of any nature depending on their usage, but the device is particularly suitable for connecting fragile and rigid pipes to any support.

The coupling method of this invention can be applied to connect pipes and supports respectively constructed from a wide variety of materials. Exemplarily, the pipes can be glass, quartz, graphite, plastic materials such as polytetrafluoroethylene, polypropylene and polyvinyl chloride, as well as a wide variety of metals including alloys specially designed for certain chemical purposes. Among the supports which can be mentioned, they can for example be made of steel, plated steel, stainless steel, nickel, copper and monel.

The support to which the pipe is connected can be, exemplarily, a chemical reactor, a distillation column, a vat or a tank. The connection obtained is particularly suitable when it is required to hold against high pressure. The top limit of permissible pressure depends on the specific resistances of the pipe itself and of the gasket 4, but in general the device can withstand without difficulty pressure from 1 to 10 absolute bars.

The gasket seat 3a, which can be made by any known mechanical procedure, presents a plane surface to support gasket 4. As gasket 4 there can be used any kind of gasket with spaced lips, namely a gasket having two separate zones of contact separated by a central annular void or groove 4b. The nature of the gasket is determined by the chemical nature of the reagents which come into contact therewith. In particular these gaskets can be made of special elastomers such as VITON, which is a hydrocarbon polymer containing fluorine, or polytetrafluoroethylene or various other types of rubbery material. On the contrary, the use of rigid gaskets such as those made from asbestos or other fibers or metal or prescribed since they do not permit the securing of a tight seal.

A tight seal is assured by compression of the lipped gasket 4 on the pipe 1 by means of any suitable tightening device, the well-known counter-clamp being advantageously used as mentioned above. The bulbiform zone 6 of pipe 1 which is located at the outer end of the gasket system must have a diameter sufficiently greater than the internal diameter of the toroidal gasket 7 to permit pipe 1 to be supported on said gasket 7 by said bulb-formed zone 6. It will be appreciated that under the weight of pipe 1, the elastomeric gasket 7 may expand somewhat and the bulb 6 must be larger than the internal diameter of gasket 7 when thus expanded. In meeting these requirements, it is generally sufficient to have the maximum diameter of the bulb-formed zone 6 equal to 40 to 50% larger than the diameter of the straight cylindrical part of pipe 1. Toroid gaskets 7 and 8 can be made from any flexible material resistant to the surrounding atmosphere.

In spite of precautions taken, with regard to the materials chosen for the lipped gasket 4, an eventual deterioration is always liable to occur. A particular embodiment of the device of this invention doubly assures the security and tightness of seal by using two of said double-lipped gaskets placed in sequence at a distance of about 10 to 20 mm and joined by a single crosspiece or bracing, the tightening being accomplished by the clamping device at the second of these lipped gaskets. This is illustrated in detail in the discussion of FIG. 2 below.

The double-gasketed form of this invention can be connected to any alarm device for the purpose of detecting the occurrence of a leak or escape of gas or liquid from the first gasket into the zone between the two gaskets. It is thus possible to shut down or stop the plant equipment while changing the damaged gasket without losing significant amounts of substances present in the system, inasmuch as the second gasket assures the necessary seal while the equipment is shut down.

The connecting device of this invention is particularly suitable for the connection of pipes used for emitting light in photochemical reactors. The industrial exploitation of the effect of light on atoms and molecules has proved to be particularly advantageous in the chlorination of hydrocarbons, more particularly of paraffins; the chlorination of organic substances such as, exemplarily, the chlorination of methly chloride; nitrosations; sulfoxidations of paraffin derivatives; and photopolymerization. Whereas conventional devices as described above for connecting glass pipes to metal reactors are not satisfactory for such purposes involving light emitters, the device according to the instant invention is found to be surprisingly suitable.

As a non-limiting example of the use of the instant connection device there can be mentioned the joining of ultraviolet radiation tubes to reactors for the photochemical chlorination of methly chloride.

The use of ultra-violet light to effect photochemical chlorination of methylchloride is well known. The chlorine molecule becomes ionized into chloride and positive chloron ions which act upon methylchloride to form mixtures of molecules having different degrees of chlorination, namely methylene chloride, chloroform and carbon tetrachloride.

Figure 2:
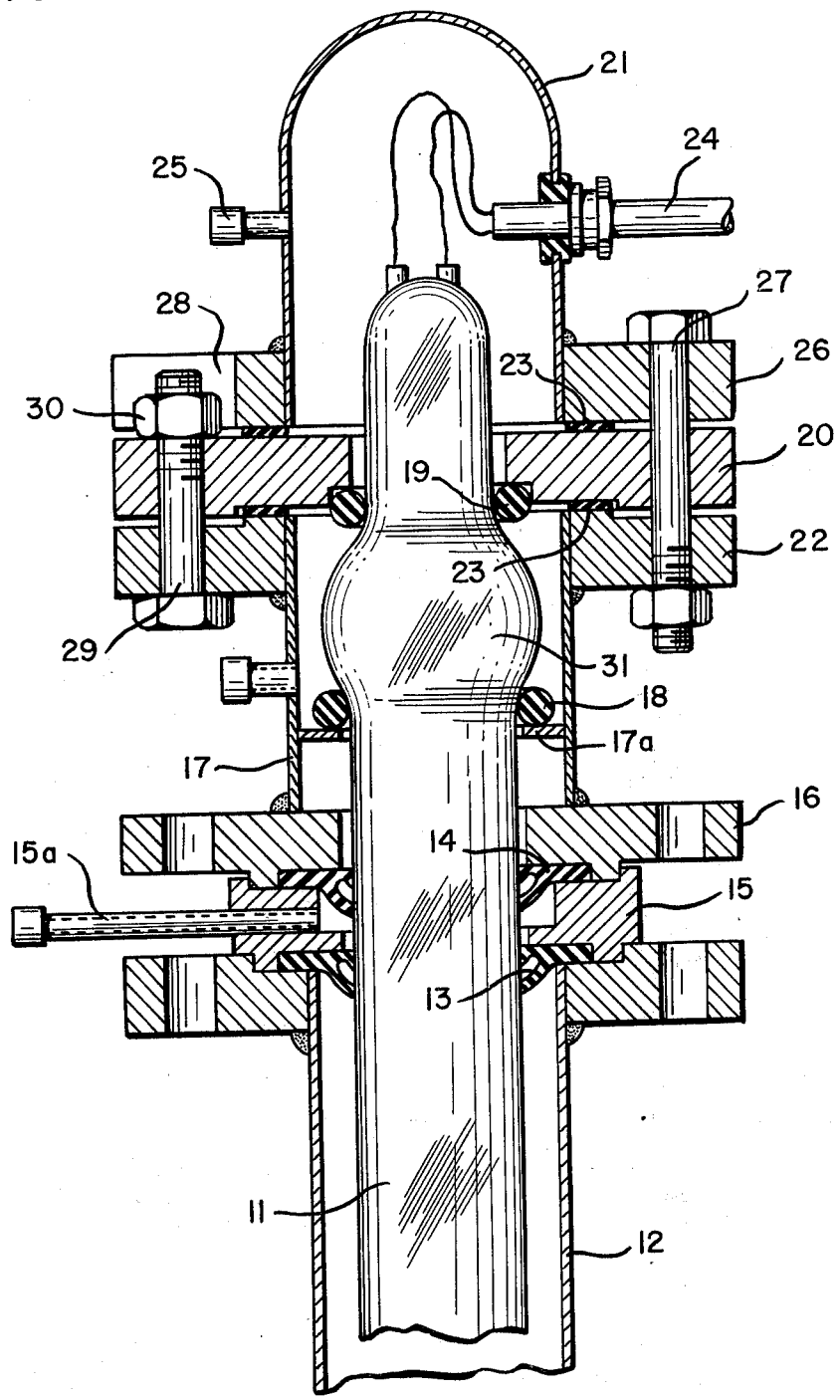
FIG. 2 is a sectional view of a modification of the coupling shown in FIG. 1.

The ultra-violet generating tubes are generally used in large numbers in glass tubes having a diameter of from 40 to 80 mm. FIG. 2 illustrates the connection of such a pipe, by the particularly suitable method of the instant invention, to a metal reactor, exemplarily to a reactor constructed of nickel wherein the photochemical chlorination reaction proceeds. In this type of procedure, the electrodes supplying the emission of ultra-violet light should be pressurized with nitrogen for purposes of safety. Pipe 11, the pipe or tube to be connected or attached to the reactor, contains the UV emitter and is attached to the tubular support 12 extending from the reactor through the agency of a first lipped gasket 13 made of Viton and being of a proprietary "lipped tightness" type marketed by the CEFI-LAC Company. This lipped gasket is joined to a second lipped gasket 14 of the same kind by means of the crosspiece 15 provided with a small side tube 15a which permits detection by any suitable device of any eventual leak in the first gasket 13. The assembly of the gaskets 13 and 14 is compressed against pipe 11 through a clamp or flange collar 16 on which is fixed a cylindrical housing 17 having at a suitable weight a flat surface 17a supporting a toroid gasket 18, made of Viton. Tube 11 is supported on the toroid gasket 18 by means of the bulb-formed zone or enlargement 31 which is larger in diameter than the internal diameter of said toroidal gasket 18 when expanded under the weight of bulb 11 resting thereon.

The upper portion of pipe or housing 17 is terminated by a collar 22 provided with conventional gasket 23 effecting a tight seal. A second toroid gasket 19 between collar 22 and clamping member 20 and of the same type as the first is secured in place by means of said clamping member 20, the whole being covered with a steel dome or lid 21, said lid being provided with two apertures or little tubes 24 and 25 for the respective purposes of (a) accommodating the wires supplying the electric current for the electrodes of the light emission system and (b) permitting the introduction of nitrogen to pressurize the space under the dome. Dome 21 is secured by flange 26 and bolts 27 (only one being shown) to the collar 22. The flange 26 has openings 28 to accommodate bolts 29 and nuts 30 which clamp collar 22 and clamping member 20 together.

Devices as above described have been successfully employed to connect fourteen U.V. — emission tubes to a reactor used for photochemical chlorination of methyl chloride, each tube having 60 mm diameter and 3 meters length. These tubes were in continuous performance over a period of two years without any damage to the tubes.

We claim:

1. A non-rigid pressure seal device comprising a rigid circular pipe, a second circular pipe having a bulb-shaped zone with toroidal flexible gaskets surrounding said second circular pipe and disposed adjacent to each end of the bulb-shaped zone; said bulb-shaped zone resting on and supported by at least one of said toroidal gaskets; a housing including means to positionally hold said toroidal gaskets adjacent to each end of the bulb-shaped zone; at least one double-lipped gasket attached to said second circular pipe in scaling and sealing engagement therewith a point below the toroidal flexible gaskets; clamping means for mounting said double-lipped gaskets to said rigid circular pipe; means for securing said housing to said clamping means whereby said second circular pipe is resiliently supported within said rigid pipe.

2. The device of claim 1 wherein two double-lipped gaskets are superimposed in spaced relationship to each other providing a zone therebetween.

3. The device of claim 2 wherein the zone between the superimposed gaskets is provided with an alarm system means for alerting when there is a leakage in the first gasket.

4. A non-rigid pressure seal device comprising a rigid circular pipe, a second circular pipe having a bulb-shaped zone with toroidal flexible gaskets surrounding said second circular pipe and disposed adjacent to each end of the bulb-shaped zone; said bulb-shaped zone resting on and supported by at least one of said toroidal gaskets; a housing including means to positionally hold said toroidal gaskets adjacent to each end of the bulb-shaped zone; at least one flexible double-lipped gasket attached to said second circular pipe in a manner that each of the lips of said gaskets contacts said second circular pipe at an acute angle with respect to the axis of said second circular pipe and in sealing engagement therewith at a point below the toroidal flexible gasket; and means for mounting said double-lipped gasket to said rigid pipe whereby said second pipe is resiliently supported with respect to said rigid pipe.

5. The device of claim 4 in which the double-lipped gasket is secured to the rigid circular pipe by a means of a clamping mechanism and the housing includes means for securing it to said clamping mechanism.

6. The device of claim 4 wherein two double-lipped gaskets are superimposed in spaced relationship to each other providing a zone therebetween.

7. The device of claim 6 wherein the zone between the two superimposed gaskets is provided with an alarm system means for alerting when there is a leakage in the first gasket.

* * * * *